United States Patent

Ansley

(10) Patent No.: US 10,581,685 B2
(45) Date of Patent: Mar. 3, 2020

(54) METHOD FOR AUTOMATIC TRACKING OF HYBRID FIBER COAXIAL UPSTREAM SERVICE UPGRADES

(71) Applicant: ARRIS Enterprises, Inc., Suwanee, GA (US)

(72) Inventor: Carol J. Ansley, Johns Creek, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/563,680

(22) Filed: Dec. 8, 2014

(65) Prior Publication Data

US 2016/0164758 A1 Jun. 9, 2016

(51) Int. Cl.
*G06F 15/173* (2006.01)
*H04L 12/24* (2006.01)
(Continued)

(52) U.S. Cl.
CPC ........ *H04L 41/0853* (2013.01); *H04L 12/403* (2013.01); *H04L 41/082* (2013.01);
(Continued)

(58) Field of Classification Search
CPC ............ H04L 12/2801; H04L 12/2865; H04L 12/287; H04L 41/08; H04L 43/065; H04L 12/403; H04L 41/082; H04L 41/0853; H04L 41/12; H04N 21/222; H04N 21/23614; H04N 21/2385; H04N 21/239;
(Continued)

(56) References Cited

U.S. PATENT DOCUMENTS 8,910,230 B2 * 12/2014 Rakib ................ H04N 21/6118
725/118
8,938,769 B2 * 1/2015 Rakib ................ H04N 21/6118
725/119
(Continued)

FOREIGN PATENT DOCUMENTS

WO 2005/048510 A2 5/2005

OTHER PUBLICATIONS

"Data Over Cable Service Interface Specifications: DOCSIS 3.0, Physical Layer Specification", Document No. CM-SP-PHYv3.0-I04-070518, Cable Television Laboratories, Inc., May 2007.
(Continued)

*Primary Examiner* — Davoud A Zand
*Assistant Examiner* — Dixon F Dabipi
(74) *Attorney, Agent, or Firm* — Stewart M. Wiener

(57) ABSTRACT

A method implemented in a computer system for determining upstream transmission capability in an area of a hybrid fiber-coaxial (HFC) cable plant network, the area including network components, and customer premises equipment (CPE) devices. The method configures a downstream transmission that includes a marker channel, and initiates the downstream transmission to each CPE device. The method sends a query to each CPE device to request a status of the marker channel at the CPE device. The method receives a response to the query from at least one CPE device, and determines a status of each network component based on the response to the query from said at least one CPE device subtending from the network component.

19 Claims, 4 Drawing Sheets

(51) Int. Cl.
  *H04N 21/434*  (2011.01)
  *H04N 7/10*  (2006.01)
  *H04N 21/61*  (2011.01)
  *H04N 21/2385*  (2011.01)
  *H04N 21/239*  (2011.01)
  *H04N 21/222*  (2011.01)
  *H04L 12/403*  (2006.01)
  *H04N 21/236*  (2011.01)
  *H04N 21/6547*  (2011.01)

(52) U.S. Cl.
  CPC ............ *H04L 41/12* (2013.01); *H04N 7/102* (2013.01); *H04N 21/222* (2013.01); *H04N 21/239* (2013.01); *H04N 21/2385* (2013.01); *H04N 21/23614* (2013.01); *H04N 21/4348* (2013.01); *H04N 21/6118* (2013.01); *H04N 21/6168* (2013.01); *H04N 21/6547* (2013.01)

(58) Field of Classification Search
  CPC ........... H04N 21/4348; H04N 21/6118; H04N 21/6168; H04N 21/6547; H04N 7/17309; H04N 7/102
  See application file for complete search history.

(56) References Cited

U.S. PATENT DOCUMENTS

| | | | | |
|---|---|---|---|---|
| 9,015,270 | B2* | 4/2015 | Cholas | H04L 12/2812 709/217 |
| 9,692,612 | B2* | 6/2017 | Rakib | H04N 21/2221 |
| 2002/0056134 | A1* | 5/2002 | Abe | H04N 1/40 725/120 |
| 2002/0144290 | A1* | 10/2002 | Ovadia | H04N 21/4382 725/119 |
| 2003/0016701 | A1* | 1/2003 | Hinson | H04B 1/0003 370/480 |
| 2006/0235476 | A1* | 10/2006 | Gunderson | A61B 5/0456 607/5 |
| 2009/0074423 | A1* | 3/2009 | Bernard | H04J 3/0682 398/135 |
| 2011/0145809 | A1* | 6/2011 | Hwang | G06F 8/65 717/173 |
| 2013/0125182 | A1* | 5/2013 | Bowler | H04H 60/43 725/105 |
| 2013/0322504 | A1* | 12/2013 | Asati | H04L 41/0853 375/224 |

OTHER PUBLICATIONS

"Data-Over-Cable Service Interface Specifications: DOCSIS 3.1, Physical Layer Specification", Document No. CM-SP-PHYv3.1-I01-131029, Cable Television Laboratories, Inc., Oct. 2013.

J. Chapman, "Taking the DOCSIS Upstream to a Gigabit Per Second", National Cable & Telecommunications Association (NCTA), 2010 Spring Technical Forum Proceedings (2010).

P. Miguelez, "Making Room for DOCSIS 3.1 and EPoC—Is your cable plant ready for an OFDM world?", National Cable & Telecommunications Association (NCTA), 2013 Spring Technical Forum Proceedings (2013).

D. Urban, "Comparison of Techniques for HFC Upstream Capacity Increase", National Cable & Telecommunications Association (NCTA), 2010 Spring Technical Forum Proceedings (2010).

Great Britain Combined Search and Examination Report, RE: Application No. GB1519775.9, dated Jan. 5, 2016.

Examination Report, RE: European Application No. 15193764.6, dated Nov. 20, 2018.

* cited by examiner

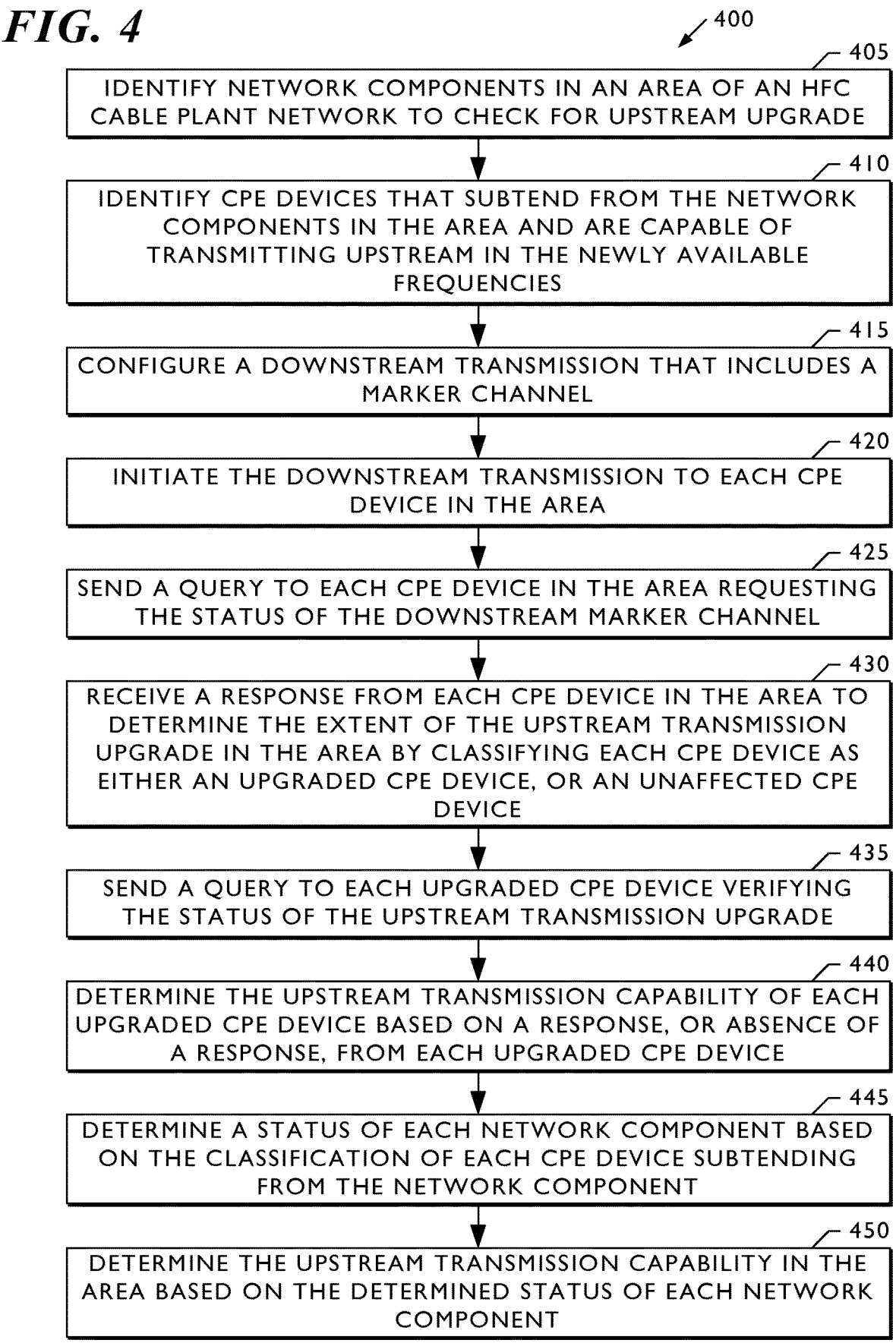

METHOD FOR AUTOMATIC TRACKING OF HYBRID FIBER COAXIAL UPSTREAM SERVICE UPGRADES

BACKGROUND

A hybrid fiber-coaxial (HFC) network is a broadband network that combines optical fiber and coaxial cable. The HFC network typically provides two-way communication between a cable operator's headend facility and a subscriber's location. The headend facility collects and processes communication signals, and distributes the signals to the subscriber's location using a downstream communication path. Customer premises equipment (CPE), typically a set-top box, gateway, or cable modem, at the subscriber's location receives the communication signals on the downstream communication path, and transmits other communication signals to the headend facility using an upstream communication path.

The headend processes all of the upstream and downstream traffic in an HFC cable plant. Currently, the cable television industry in the United States utilizes a split spectrum allocation that has upstream channels at 5-42 MHz, and downstream channels at 54-1000 MHz. Currently, the cable television industry in the rest of the world utilizes a split stream allocation that has upstream channels at 5-65 MHz, and downstream channels at 88-860 MHz.

For several years, the cable television industry in the United States has considered moving the upstream/downstream spectrum split. Radio frequency over glass (RFoG), a telecommunications network design that replaces the coax portion of the HFC network with a single-fiber passive optical network (PON), can support an expended upstream spectrum split. In addition, the Data Over Cable Service Interface Specification (DOCSIS) 3.0 standard can support an upstream/downstream spectrum split at 85 MHz, and the DOCSIS 3.1 standard can support an upstream/downstream spectrum split at 200 MHz.

BRIEF DESCRIPTION OF THE DRAWINGS

FIG. 4 is a flow diagram that illustrates one embodiment of a method for determining upstream transmission capability in an HFC cable plant.

DETAILED DESCRIPTION

Figure 1:
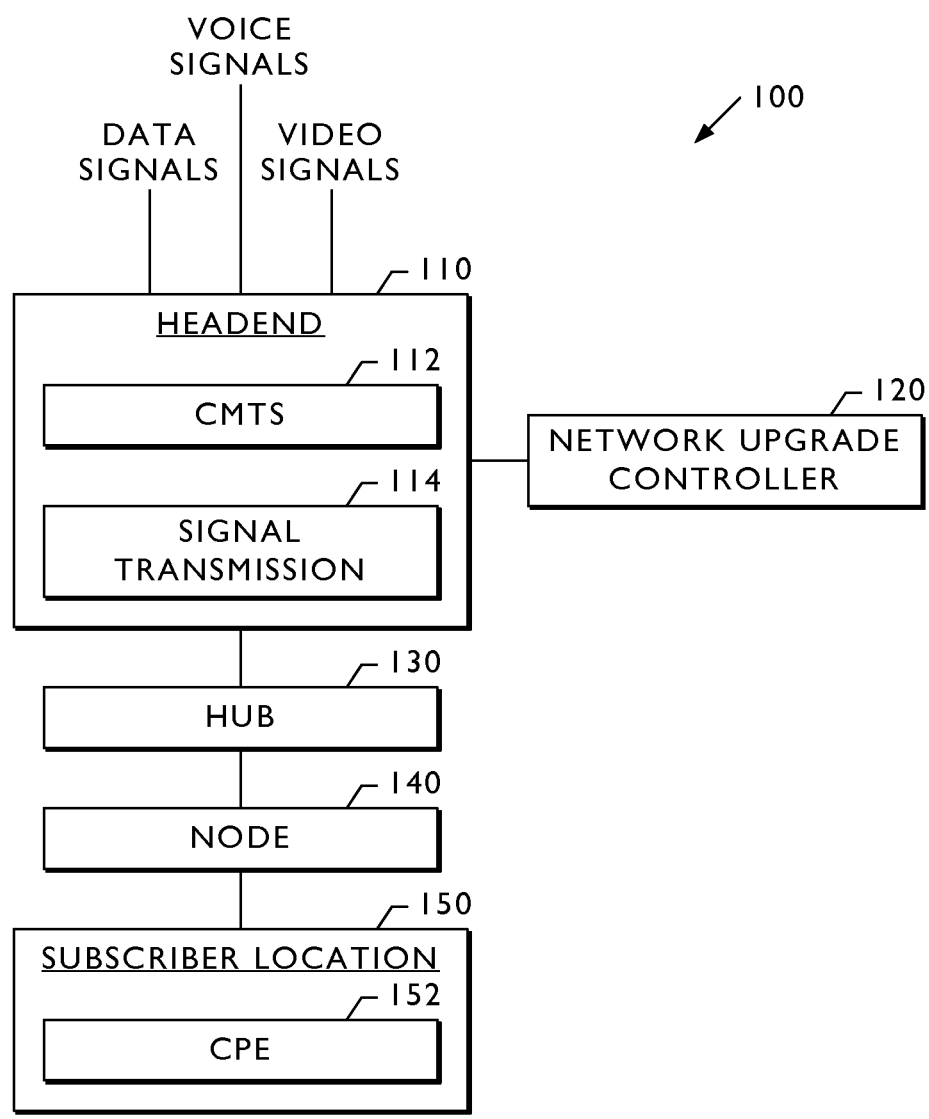
FIG. 1 is a block diagram that illustrates one embodiment of the hardware components of a system for determining upstream transmission capability in an HFC cable plant.

FIG. 1 is a block diagram that illustrates one embodiment of the hardware components of a system for determining upstream transmission capability in an HFC cable plant. An HFC cable plant network 100, as shown in FIG. 1, is a data and video content network that connects a cable television headend 110, and a network upgrade controller 120, to customer premises equipment (CPE) 152 at a subscriber location 150. The HFC cable plant network 100, as shown in FIG. 1, may include any number of interconnected CPE 152, and subscriber location 150 components. The CPE 152 is a device, such as a cable modem, gateway, or set-top box, that the network upgrade controller 120 may interrogate to determine the status of the device. In one embodiment, the CPE 152 is an internet protocol (IP) addressable device. The connection between the headend 110 and the subscriber location 150 typically passes through one or more hub 130 or node 140 components. The combination of hub 130 and node 140 components transition the connection from fiber at the headend 110 to coaxial at the subscriber location 150. The hub 130 and node 140 components include active and passive network components that the cable operator replaces when upgrading the HFC cable plant network 100, for example, to upgrade the upstream transmission capability.

The headend 110 is a master facility for receiving television signals that are processed and distributed through the HFC cable plant network 100. In one embodiment, the signals processed and distributed at the headend 110 include communications traffic such as data signals, voice signals, video signals, and the like. The headend 110 includes a cable modem termination system (CMTS) 112 to provide high-speed data services, such as cable Internet or voice over Internet Protocol, to cable subscribers. The CMTS 112 includes an Ethernet interface to the Internet and telephone networks, and a radio frequency (RF) interface to the subscriber location 150. The CMTS 112 routes upstream and downstream traffic between the Internet and telephone networks, and the CPE 152 at the subscriber location 150, through the regional or local hub 130 and node 140 components. The headend 110 also includes a signal transmission 114 component to deliver the video signals to the CPE 152 at the subscriber location 150. In one embodiment, the signal transmission 114 component is a quadrature amplitude modulation (QAM) signal transmission.

As shown in FIG. 1, the network upgrade controller 120 is a general-purpose server computer that communicates with the CPE 152 at a subscriber location 150 through the headend 110. In another embodiment, the network upgrade controller 120 is a computer program resident in the CMTS 122. The network upgrade controller 120 queries the CPE 152 at a subscriber location 150 to determine whether the cable operator has upgraded the HFC cable plant network 100 components associated with the CPE 152 to implement the change to the upstream spectrum split frequency. The upgrade of the HFC cable plant network 100 to change the upstream spectrum split frequency is a major undertaking because the cable operator needs to swap out every plant component that includes a diplexer, including both passive and active network components. If the network upgrade misses even one plant component, the CPE 152 devices that subtend from the rogue component will not work properly in the expanded upstream frequencies. As used herein, a device subtends from a component when the device extends under the component in a topological structure of a network.

Figure 2:
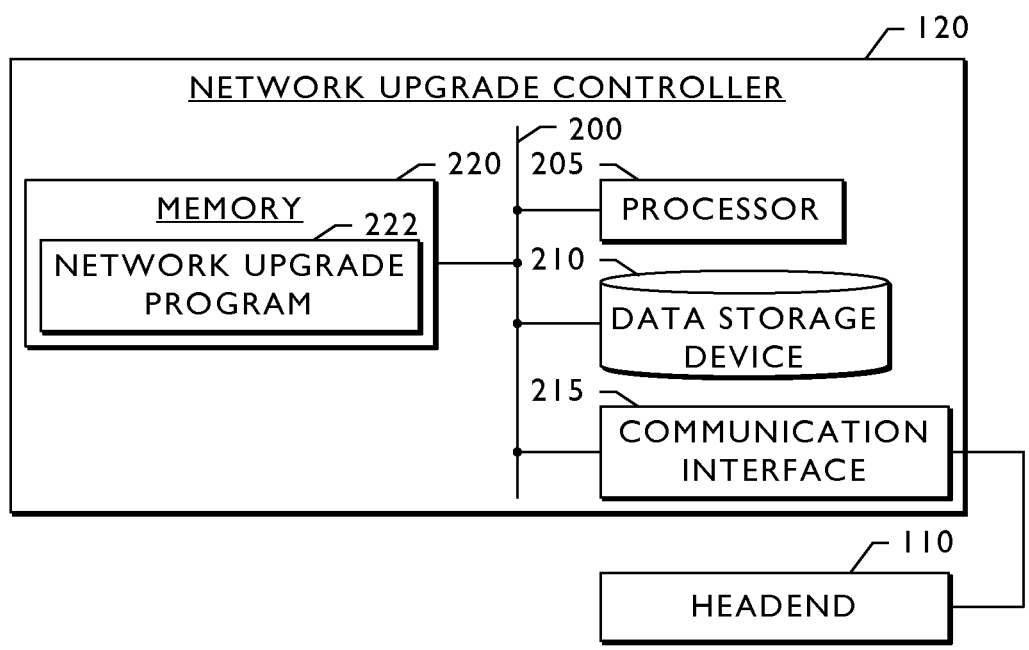
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. Specifically, FIG. 2 illustrates, in detail, one embodiment of the network upgrade controller 120.

The network upgrade controller 120 shown in FIG. 2 is a general-purpose computer. A bus 200 is a communication medium connecting a processor 205, data storage device 210 (such as a serial ATA (SATA) hard disk drive, optical drive, small computer system interface (SCSI) disk, flash memory, or the like), communication interface 215, and memory 220 (such as random access memory (RAM), dynamic RAM (DRAM), non-volatile computer memory, flash memory, or the like). The communication interface 215 allows for two-way communication of data and content between the network upgrade controller 120 and headend 110, and between the network upgrade controller 120 and CPE 152 via the headend 110.

The processor 205 of the network upgrade controller 120 performs the disclosed methods by executing sequences of operational instructions that comprise each computer program resident in, or operative on, the memory 220. The reader should understand that the memory 220 may include operating system, administrative, and database programs that support the programs disclosed in this application. In one embodiment, the configuration of the memory 220 of the network upgrade controller 120 includes a network upgrade program 222. The network upgrade program 222 performs the method disclosed in the exemplary embodiments depicted in FIG. 3 and FIG. 4. When the processor 205 performs the disclosed method, it stores intermediate results in the memory 220 or data storage device 210. In another embodiment, the processor 205 may swap these programs, or portions thereof, in and out of the memory 220 as needed, and thus may include fewer than all of these programs at any one time.

Figure 3:
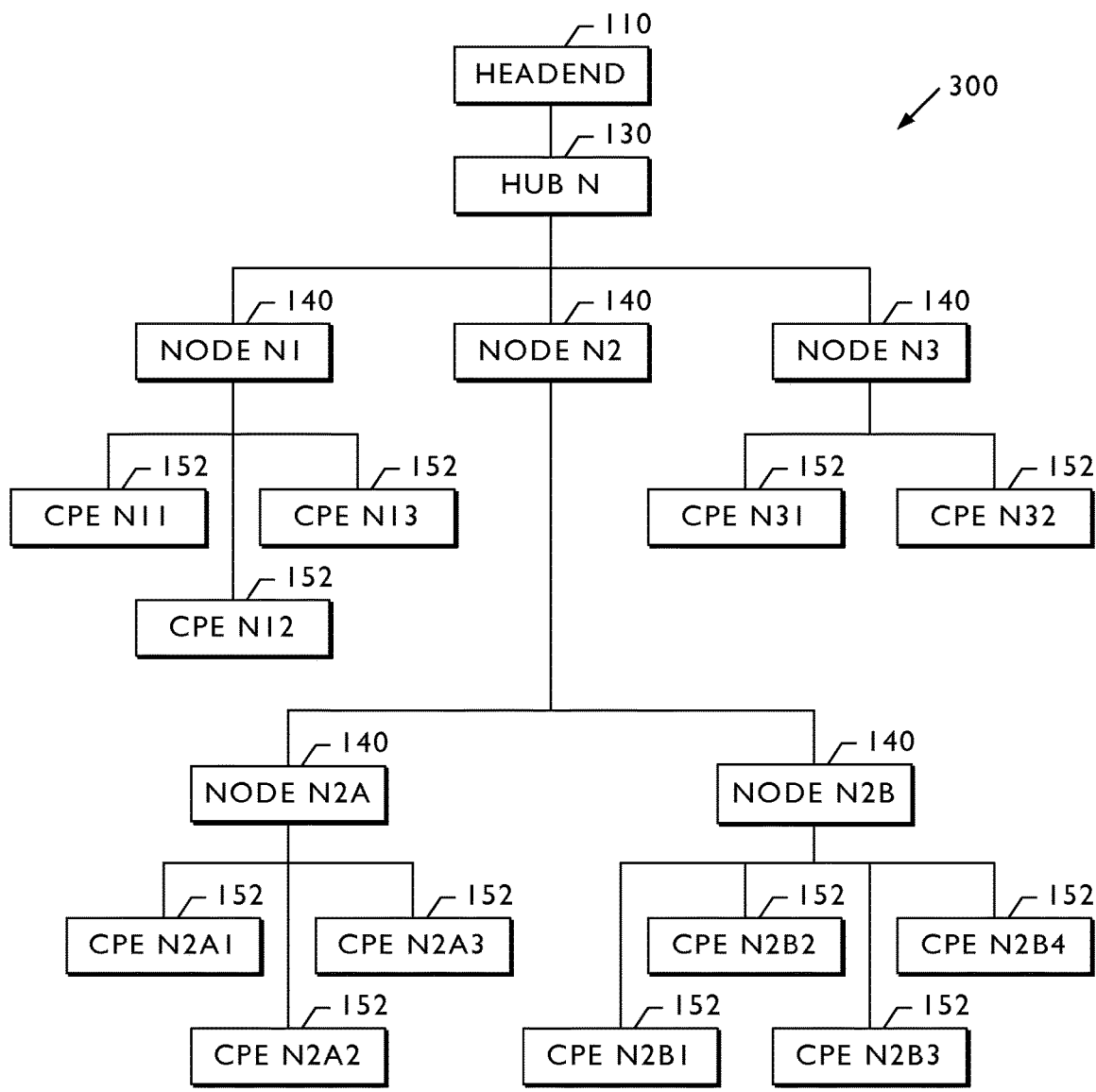
FIG. 3 is a network diagram that illustrates one exemplary embodiment of a method for determining upstream transmission capability in an HFC cable plant.

FIG. 3 is a network diagram that illustrates one exemplary embodiment of a method for determining upstream transmission capability in an HFC cable plant. The exemplary network diagram shown in FIG. 3 depicts an area 300, a portion of the HFC cable plant network 100, that includes a headend 110, hub 130 and node 140 components, and CPE 152 devices. Each CPE 152 device shown in FIG. 3 subtends from either a hub 130 or node 140 component. Hub N 130 subtends from the headend 110. Node N1 140, Node N2 140, and Node N3 140 subtend from Hub N 130. CPE N11 152, CPE N12 152, and CPE N13 152 subtend from Node N1 140. Node N2A 140 and Node N2B 140 subtend from Node N2 140. CPE N2A1 152, CPE N2A2 152, and CPE N2A3 152 subtend from Node N2A 140. CPE N2B1 152, CPE N2B2 152, CPE N2B3 152, and CPE N2B4 152 subtend from Node N2B 140. CPE N31 152 and CPE N32 152 subtend from Node N3 140.

FIG. 4 is a flow diagram that illustrates one embodiment of a method for determining upstream transmission capability in an HFC cable plant. The process 400 starts by identifying network components in an area of the HFC cable plant network 100 to check for upstream upgrade (step 405). To implement the upstream upgrade for the area, the cable operator upgrades each network component, including active and passive network components, in the area that includes a diplexer to utilize the expanded upstream frequencies. In one embodiment, the area to check for upstream upgrade is the entire HFC cable plant network 100. In another embodiment, the area is a subnet, or a portion, of the entire HFC cable plant network 100.

The process 400 shown in FIG. 4 continues by identifying the CPE 152 devices that subtend from the network components in the area and are capable of transmitting upstream in the newly available frequencies (step 410). If the upstream upgrade process misses even one network component in the area, the CPE 152 devices that subtend from any upgraded network component that the upstream upgrade process missed may not work properly in the expanded upstream frequencies. In one embodiment, the CPE 152 devices that the process 400 identifies have the capability of receiving downstream transmissions from the headend 110 in the frequency band to be upgraded, but not all devices have the capability of transmitting in the frequency band to be upgraded.

The process 400 shown in FIG. 4 continues by configuring a downstream transmission that includes a marker channel (step 415). In one embodiment, the marker channel is an existing quadrature amplitude modulation (QAM) channel. In another embodiment, the marker channel is a continuous tone sent at a frequency within the band of frequencies that the cable operator is converting from downstream to upstream transmissions. In another embodiment, the configuring of the downstream transmission includes configuring a receiver on CMTS 112 that can receive signals within the upgrade frequency band.

The process 400 shown in FIG. 4 continues by initiating the downstream transmission that includes the marker channel to each CPE 152 device in the area (step 420). In one embodiment, when the configuring of the downstream transmission (step 415) includes configuring a receiver on the CMTS 112, the CMTS 112 performs the sending of the downstream transmission.

The process 400 shown in FIG. 4 continues by sending a query to each CPE 152 device in the area requesting the status of the downstream marker channel (step 425). In one embodiment, the process 400 selects a representative selection of CPE 152 devices in the area such that each area under consideration has at least one CPE 152 device queried with the same results as if all devices were queried. The process 400 then receives a response from each CPE 152 device in the area to determine the extent of the upstream transmission upgrade in the area by classifying each CPE 152 device as either an upgraded CPE device or an unaffected CPE device (step 430). In one embodiment, even if all CPE 152 devices do not respond in a timely manner, as long as responses are received from a representative subset of CPE 152 devices in the area, even as small as a single CPE 152 device in the affected area, then the process 400 can still proceed. When a CPE 152 device in the area receives the query requesting the status of the downstream marker channel (step 425) and sends a response that includes a tune success, the process 400 classifies the CPE 152 device as an unaffected CPE device (step 430) because the marker channel is still present at the CPE device 152. When a CPE 152 device in the area receives the query requesting the status of the downstream marker channel (step 425) and sends a response that includes a tune failure, the process 400 classifies the CPE 152 device as an upgraded CPE device (step 430) because the marker channel is not present at the CPE device 152. Thus, when the cable operator has upgraded all of the network components in the area, the CPE 152 devices that subtend from those network components will not detect the marker channel in the downstream transmission because those network components will prevent the downstream transmission from succeeding.

The process 400 shown in FIG. 4 continues by sending a query to each CPE 152 device in the area classified as an upgraded CPE device to verify the status of the upstream transmission upgrade (step 435). In one embodiment, the query to each CPE 152 device in the area classified as an upgraded CPE device is a request to respond upstream on one or more of the frequencies within the upgraded frequency band. In one embodiment, when the configuring of the downstream transmission (step 415) includes configuring a receiver on the CMTS 112, the CMTS 112 performs the sending of the request to respond upstream on one or more of the frequencies within the upgraded frequency band. The process 400 then determines the upstream transmission capability of each upgraded CPE device based on a response, or absence of a response, from each upgraded CPE device (step 440). When the process 400 receives a response from the upgraded CPE device, the upgrade of the upstream transmission path is correct. When the process 400 does not receive a response from the upgraded CPE device, the upgrade of the upstream transmission path is not correct. In one embodiment, the verification includes generating a report of each upgraded CPE device and whether that device responded on the selected frequency or frequencies within the upgraded frequency band.

The process 400 shown in FIG. 4 continues by determining a status of each network component based on the classification of each CPE 152 device subtending from the network component (step 445). In one embodiment, the process 400 determines the status of each network component after verification of the upstream transmission upgrade of the CPE 152 devices that subtend from those network components.

The process 400 shown in FIG. 4 continues by determining the upstream transmission capability in the area based on the determined status of each network component (step 450). In one embodiment, the process 400 generates a report of the network components and the status of the upstream transmission upgrade for each network component. In another embodiment, the process 400 generates a network topology that illustrates each network component and CPE 152 device in the area, and an indication that each network component or CPE 152 device has been successfully confirmed to have been upgraded. In another embodiment, the network topology marks each network branch with incomplete network upgrades based upon the network topology map and responses from the CPE 152 devices. The report, or list, of network components, or the network topology, are tools that allow the administrator of the area, or HFC cable plant network 100, to determine the progress of the upstream transmission upgrade in the HFC cable plant network 100.

By way of example, if an administrator applied the process 400, shown in FIG. 4, to area 300, shown in FIG. 3, an exemplary network topology may indicate that CPE N31 and CPE N32 are unaffected CPE devices because the query requesting the status of the downstream marker channel (step 425) elicited a tune success response from CPE N31 and CPE N32 (step 430). Using this exemplary network topology, the administrator of the area 300 would determine that the upstream upgrade is not complete for the area 300, and would know that Node N3 140 is likely a component that was not upgraded. The network topology may also indicate that CPE N2A1 and CPE N2B2 are upgraded CPE devices because the query requesting the status of the downstream marker channel (step 425) elicited a tune failure response from CPE N2A1 and CPE N2B2 (step 430). If the network topology indicates, however, that the query verifying the status of the upstream transmission upgrade (step 435) elicited a tune success response from CPE N2B2 (step 440) and a tune failure response from CPE N2A1, then the network topology would indicate that Node N2 and Node N2B were both upgraded, but that the upgrade of Node N2 is complete and the upgrade of Node N2A is not yet complete.

The area 300 depicted in FIG. 3 is a simplified network topology. One skilled in the art will appreciate that a typical HFC cable plant network 100 may include many thousands of network components that the administrator needs to examine to determine upstream transmission capability in an HFC cable plant, and to certify that the upstream upgrade is complete.

Although the disclosed embodiments describe a fully functioning method implemented in a computer system for determining upstream transmission capability in an HFC cable plant, the reader should understand that other equivalent embodiments exist. Since numerous modifications and variations will occur to those reviewing this disclosure, the method implemented in a computer system for determining upstream transmission capability in an HFC cable plant is not limited to the exact construction and operation illustrated and disclosed. Accordingly, this disclosure intends all suitable modifications and equivalents to fall within the scope of the claims.

I claim:

1. A computing device for determining upstream transmission capability in an area of a hybrid fiber-coaxial (HFC) cable plant network, the network comprising a plurality of network components located in the area and a plurality of customer premises equipment (CPE) devices located in the area, the computing device comprising:
    a memory device resident in the computing device; and
    a processor disposed in communication with the memory device, the processor configured to:
        configure a downstream transmission that includes a marker channel at a frequency within a band of frequencies selected by an operator of the HFC cable plant network for conversion from downstream to upstream transmissions;
        initiate the downstream transmission to each CPE device;
        send a query to each CPE device, the query for eliciting an indication of whether the marker channel is tunable at the CPE device;
        receive a response to the query from at least one CPE device, the response comprising one of a tune success response and a tune failure response; and
        determine, for each responding CPE device, based on the response to the query from the responding CPE device, an upstream transmission capability status for a respective network component from which the responding CPE device subtends, wherein the respective network component is in the plurality of network components located in the area.

2. The computing device of claim 1, wherein the network components include active network components, and passive network components.

3. The computing device of claim 1, wherein each CPE device is an internet protocol (IP) addressable device.

4. The computing device of claim 1, wherein each CPE device is at least one of a set-top box, a gateway, and a cable modem.

5. The computing device of claim 1, wherein the downstream transmission is a quadrature amplitude modulation (QAM) signal transmission, and wherein the marker channel is a QAM channel.

6. The computing device of claim 1, wherein the marker channel is a continuous tone sent at a frequency within a band of upgrade frequencies.

7. The computing device of claim 1, wherein when the response to the query is the tune success response, the CPE device is an unaffected CPE device, and wherein when the response is the tune failure response, the CPE device is an upgraded CPE device.

8. The computing device of claim 7, wherein the processor is further configured to:
    send a second query to each upgraded CPE device, the second query requesting a response on at least one upstream frequency within a band of upgrade frequencies to verify the status of the upstream transmission upgrade for the upgraded CPE device; and
    receive a response to the second query from at least one upgraded CPE device on said at least one upstream frequency, wherein the determining of the status of each network component is further based on the response to the second query from said at least one upgraded CPE device.

9. The computing device of claim 1, wherein the processor is further configured to:
determine the upstream transmission capability in the area based on the status determined for each network component.

10. A method implemented in a computer system for determining upstream transmission capability in an area of a hybrid fiber-coaxial (HFC) cable plant network, the network comprising a plurality of network components located in the area and a plurality of customer premises equipment (CPE) devices located in the area, the method comprising:
configuring a downstream transmission that includes a marker channel at a frequency within a band of frequencies selected by an operator of the HFC cable plant network for conversion from downstream to upstream transmissions;
initiating the downstream transmission to each CPE device;
sending a query to each CPE device, the query for eliciting an indication of whether the marker channel is tunable at the CPE device;
receiving a response to the query from at least one CPE device, the response comprising one of a tune success response and a tune failure response; and
determining, for each responding CPE device, based on the response to the query from the responding CPE device, an upstream transmission capability status for a respective network component from which the responding CPE device subtends.

11. The method of claim 10, wherein the network components include active network components, and passive network components.

12. The method of claim 10, wherein each CPE device is an internet protocol (IP) addressable device.

13. The method of claim 10, wherein each CPE device is at least one of a set-top box, a gateway, and a cable modem.

14. The method of claim 10, wherein the downstream transmission is a quadrature amplitude modulation (QAM) signal transmission, and wherein the marker channel is a QAM channel.

15. The method of claim 10, wherein the marker channel is a continuous tone sent at a frequency within a band of upgrade frequencies.

16. The method of claim 10, wherein when the response to the query is the tune success response, the CPE device is an unaffected CPE device, and wherein when the response is the tune failure response, the CPE device is an upgraded CPE device.

17. The method of claim 16, further comprising:
sending a second query to each upgraded CPE device, the second query requesting a response on at least one upstream frequency within a band of upgrade frequencies to verify the status of the upstream transmission upgrade for the upgraded CPE device; and
receiving a response to the second query from at least one upgraded CPE device on said at least one upstream frequency,
wherein the determining of the status of each network component is further based on the response to the second query from said at least one upgraded CPE device.

18. The method of claim 10, further comprising:
determining the upstream transmission capability in the area based on the status determined for each network component.

19. A non-transitory computer-readable medium, comprising computer-executable instructions that, when executed on a computing device for determining upstream transmission capability in an area of a hybrid fiber-coaxial (HFC) cable plant network, the network comprising a plurality of network components located in the area and a plurality of customer premises equipment (CPE) devices located in the area, perform steps of:
configuring a downstream transmission that includes a marker channel at a frequency within a band of frequencies selected by an operator of the HFC cable plant network for conversion from downstream to upstream transmissions;
initiating the downstream transmission to each CPE device;
sending a query to each CPE device, the query for eliciting an indication of whether the upgrade detection channel is tunable at the CPE device;
receiving a response to the query from at least one CPE device, the response comprising one of a tune success response and a tune failure response; and
determining, for each responding CPE device, based on the response to the query from the responding CPE device, an upstream transmission capability status for a respective network component from which the responding CPE device subtends.

* * * * *